United States Patent [19]
Sugita

[11] Patent Number: 5,373,336
[45] Date of Patent: Dec. 13, 1994

[54] EPICYCLIC GEAR MECHANISM

[75] Inventor: Yukihiko Sugita, Hachioji, Japan

[73] Assignee: Olympus Optical Co., Ltd., Tokyo, Japan

[21] Appl. No.: 3,799

[22] Filed: Jan. 13, 1993

[30] Foreign Application Priority Data

Jan. 16, 1992 [JP] Japan .................................. 4-005923
Apr. 27, 1992 [JP] Japan .................................. 4-107981

[51] Int. Cl.⁵ .......................... G03B 17/00; G03B 1/00
[52] U.S. Cl. ...................................... 354/202; 354/212
[58] Field of Search ............ 354/202, 203, 206, 173.1, 354/195.12

[56] References Cited

U.S. PATENT DOCUMENTS

| | | | |
|---|---|---|---|
| 4,728,975 | 3/1988 | Ohara et al. | 354/173.1 |
| 4,829,328 | 5/1989 | Tanaka et al. | 354/173.1 |
| 4,903,059 | 2/1990 | Onda et al. | 354/173.1 |
| 4,949,109 | 8/1990 | Shimada et al. | 354/173.1 |
| 5,105,212 | 4/1992 | Kitazawa | 354/173.1 |
| 5,142,313 | 8/1992 | Haraguchi et al. | 354/173.1 |
| 5,160,953 | 11/1992 | Iwashita et al. | 354/173.1 |
| 5,168,295 | 12/1992 | Yoshihara et al. | 354/173.1 |

FOREIGN PATENT DOCUMENTS

55-98731 7/1980 Japan .
58-77327 5/1983 Japan .

Primary Examiner—Michael L. Gellner
Assistant Examiner—Nicholas T. Tuccillo
Attorney, Agent, or Firm—Louis Weinstein

[57] ABSTRACT

An epicyclic gear mechanism consisting of a first driven gear, a second driven gear and a rotation regulating member. The first driven gear meshes with a planet gear when the planet gear revolves about a sun gear in one direction and is rotationally driven when the planet gear rotates on its axis in the same position. The second driven gear meshes with the planet gear when the planet gear revolves in the other direction and is rotationally driven when the planet gear rotates on its axis in the same position. The rotation regulating member is actuated by interlocking with the revolving motion of the planet gear. The rotation regulating member regulates the rotation of the second driven gear by engaging with the second driven gear when the planet gear meshes with the first driven gear. The same member regulates the rotation of the first driven gear by engaging with the first driven gear when the planet gear meshes with the second driven gear.

91 Claims, 7 Drawing Sheets

EPICYCLIC GEAR MECHANISM

BACKGROUND OF THE INVENTION

1. Field of the Invention

The present invention relates generally to an epicyclic gear mechanism and, more particularly, an epicyclic gear mechanism constructed to switch over a power transmission path by changing over a rotating direction of a driving source such as a motor, etc.

2. Related Background Art

An already-known epicyclic gear mechanism rotationally driven by a driving source such as a motor is constructed to switch over a power transmission path to a plurality of driven mechanisms by changing over a rotating direction of the driving source like the motor. Considering a known zoom camera for example, when the motor rotates in one direction, its rotational driving force is transmitted to a zoom lens driving mechanism, thereby effecting a zooming action. When the motor rotates in the other direction, the power transmission path of the rotational driving force thereof is switched over. The rotational driving force is transmitted to a film winding/rewinding driving mechanism, whereby the film is fed. Further, as in the case of a camera motor drive device disclosed in Japanese Laid-Open Utility Model Application Sho/58-77327, a sun gear of the epicyclic gear mechanism is rotationally driven in one direction by the driving source such as the motor. A planet gear meshing therewith is made to revolve about the sun gear while rotating on its axis, thereby actuating a shutter release mechanism. Thereafter, the planet gear further revolves to mesh with a driving gear of a film winding mechanism. The sun gear is rotationally driven in the other direction by reversely rotating the motor. The film is thus rewound. The following defects, however, arise when employing the epicyclic gear mechanism in the manner described above and switching over the two power transmission paths in accordance with the rotating directions of the motor.

To be specific, the power transmission gear train to the driven mechanism receiving no transmission of the power is brought into a free state. Therefore, for instance, the film winding/rewinding driving mechanism makes irregular motions during zooming in the case of the zoom camera. The film deviates from a predetermined position. Besides, the zoom lens driving mechanism also makes irregular motions during the winding action of the film. A zoom lens barrel unexpectedly moves. Further, in the above-mentioned camera motor drive device, a film winding gear is not rotated during a release drive. The film winding gear is, however, engaged and therefore rotated by some external force during the release drive in some cases. This causes a frame displacement of the film and so on.

For eliminating this defect, the following construction is proposed as stated in, e.g., Japanese Laid-Open Patent Application Sho/55-98731. The planet gear is so supported on the lever as to be revolvable about the sun gear. The lever is provided with an engagement part for preventing the rotation of the other driven gear by engaging with the other driven gear when the planet gear meshes with one driven gear.

Based on the construction stated in Japanese Laid-Open Patent Application Sho/55-98731, however, the lever for stopping the other driven gear is pushed against the other driven gear by the revolving force of the planet gear. Therefore, when releasing the revolving force of the planet gear, i.e., the driving force of the motor, the stopping force of the other driven gear is relaxed. There exists a possibility where the other driven gear may rotate.

SUMMARY OF THE INVENTION

It is a primary object of the present invention, which has been devised to obviate the defects inherent in the prior art, to provide an epicyclic gear mechanism for switching over a power transmission path by causing a planet gear to mesh alternately with a plurality of driven gears, the arrangement being such that when driving one driven gear, the other driven gear is completely stopped to prevent an irregular motion thereof.

It is another object of the present invention to provide an epicyclic gear mechanism arranged such that the epicyclic gear mechanism of this invention is applied to a zoom camera, a plurality of driven gears selectively meshing with a planet gear and thereby rotationally driven are connected to a film winding/rewinding driving mechanism and a photographing lens barrel driving mechanism.

Briefly explaining, the epicyclic gear mechanism according to the present invention comprises a first driven gear, a second driven gear and a rotation regulating member. The epicyclic gear mechanism further comprises a biasing means. The first driven gear meshes with a planet gear when the planet gear revolves about a sun gear in one direction and is rotationally driven when the planet gear rotates on its axis in the same position. The second driven gear meshes with the planet gear when the planet gear revolves in the other direction and is rotationally driven when the planet gear rotates on its axis in the same position. The rotation regulating member is actuated by interlocking with the revolving motion of the planet gear. The rotation regulating member regulates the rotation of the second driven gear by engaging with the second driven gear when the planet gear meshes with the first driven gear. The same member regulates the rotation of the first driven gear by engaging with the first driven gear when the planet gear meshes with the second driven gear. The biasing means biases the rotation regulating means in such a direction as to act on the first or second driven gear. These and other objects and advantages of the present invention will become apparent from the following detailed description.

In the epicyclic gear mechanism according to the present invention, the planet gear meshes alternately with a plurality of driven gears by changing over the rotating direction of the single driving source such as a motor. The power transmission path is thus switched over. When driving one driven gear to which the power is transmitted, the freely rotatable other driven gear receiving no transmission of the power is restricted by the action of the rotation regulating member. Further, the biasing means is provided to secure this restriction even when canceling the driving force given from the driving source. The irregular motion of the driving system receiving no transmission of the power can be prevented. It is therefore possible to obviate the defects peculiar to conventional epicyclic gear mechanisms.

DETAILED DESCRIPTION OF THE PREFERRED EMBODIMENTS

Figure 1:
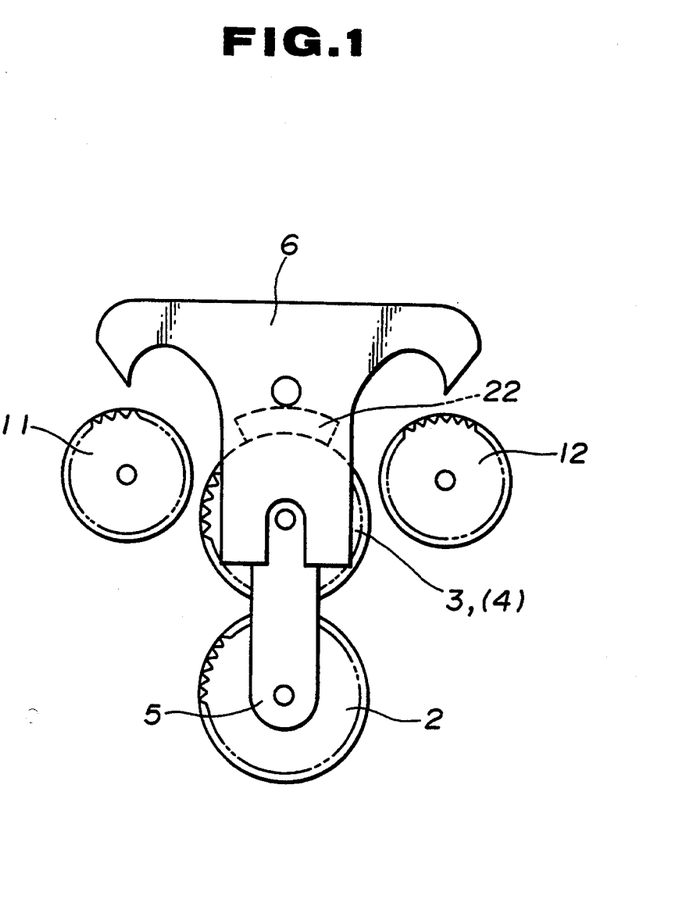
FIG. 1 is a schematic diagram of an epicyclic gear mechanism, showing a fundamental concept of the present invention.

To start with, a concept of the present invention will be explained with reference to FIG. 1 in advance of describing embodiments of the present invention.

An epicyclic gear mechanism according to the present invention comprises a sun gear 2, planet gears 3 (4), a connecting arm 5, a first driven gear 11, a second driven gear 12, an auxiliary member 22 and a rotation regulating member 6. The sun gear 2 is so driven as to be rotatable forward and reversely by a driving source such as a motor, etc. The planet gears 3 (4) always mesh with this sun gear 2. The connecting arm 5 connects the rotational center of the sun gears 2 to that of the planet gear 3 (4). The planet gears 3 (4) are revolvably supported on the periphery of the sun gear through the connecting arm 5. The first driven gear 11 provided on the trajectory of revolution of the planet gear meshes with the planet gear when the planet gear revolves in one direction. The first driven gear 11 is rotationally driven when the planet gear rotates on its axis in that position. The second driven gear 12 provided on the trajectory of revolution of the planet gear meshes with the planet gear when the planet gear revolves in the other direction. The second driven gear 12 is rotationally driven when the planet gear rotates on its axis in that position. The auxiliary member 22 is provided on the trajectory of revolution of the planet gear between the first and second driven gears. The auxiliary member 22 assists the revolving motion of the planet gear. The rotation regulating member 6 is actuated by interlocking with the revolving motion of the planet gear. When the planet gear meshes with the first driven gear, the rotation regulating member 6 regulates the rotation of the second driven gear while engaging with the second driven gear. When the planet gear meshes with the second driven gear, the rotation regulating member 6 regulates the rotation of the first driven gear while engaging with the first driven gear.

FIGS. 2-5 in combination show one embodiment of the present invention.

Note that the epicyclic gear mechanism of this invention is applied to a zoom camera in accordance with this embodiment. The following is a description of a case where the transmission of a rotational driving force of a single motor serving as a driving source is switched over to a zoom lens driving mechanism and a film winding/rewinding mechanism.

Figure 2:
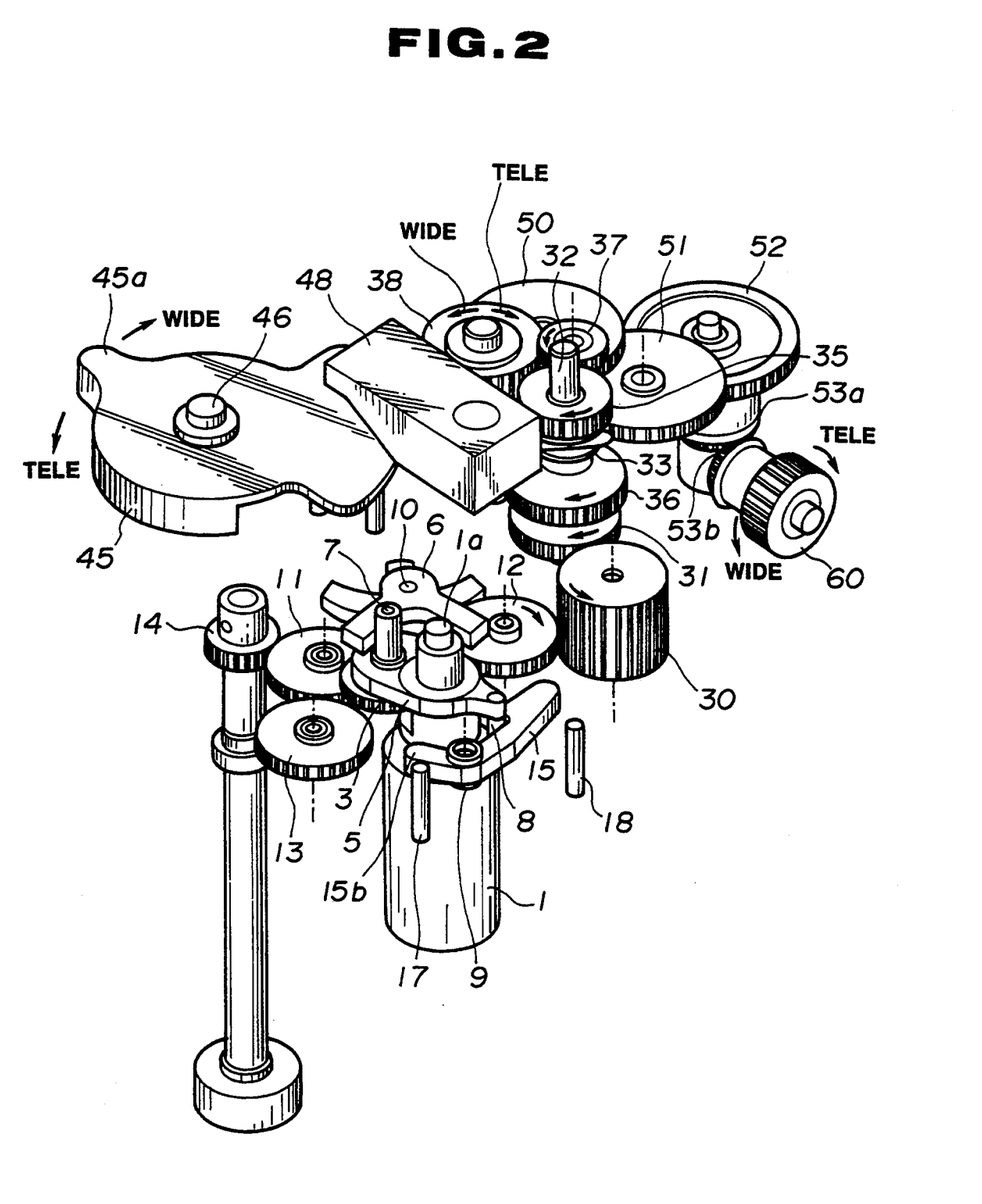
FIG. 2 is a perspective view showing a construction where the epicyclic gear mechanism of this invention is applied to a power switching mechanism of a zoom lens driving mechanism and a film winding driving mechanism of a zoom camera.
Figure 3:
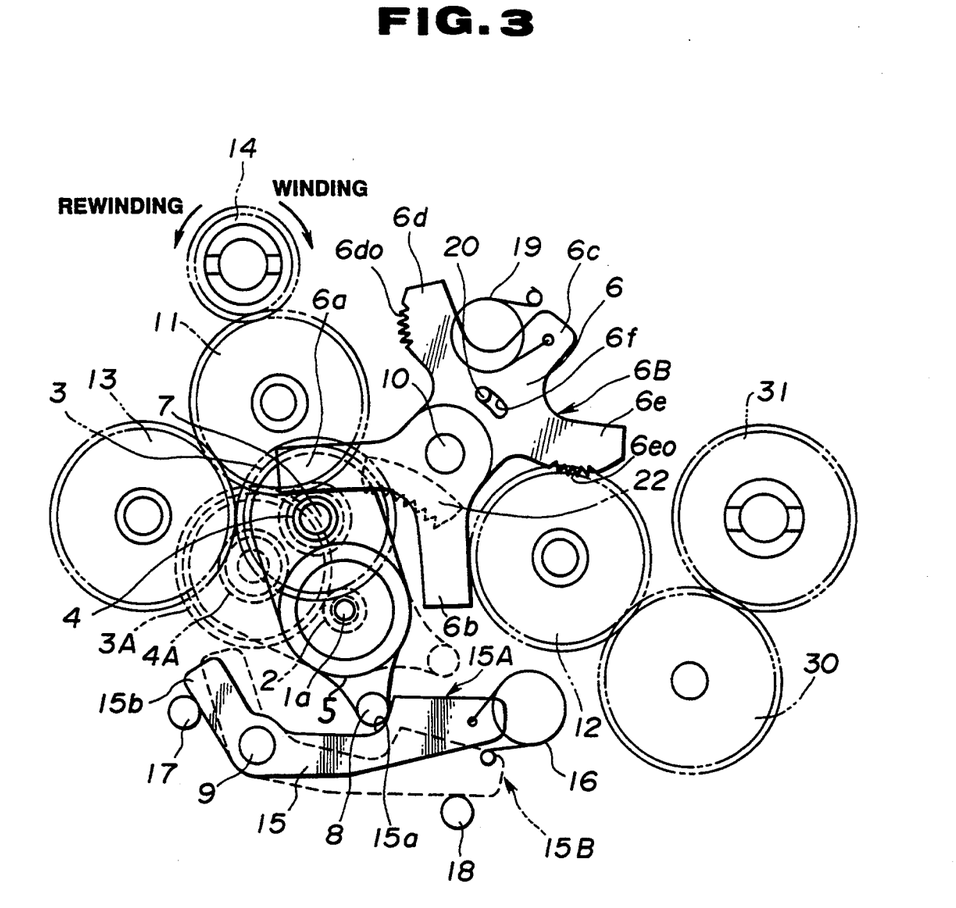
FIG. 3 is a plan view of the epicyclic gear mechanism, illustrating one embodiment of the present invention.
Figure 4:
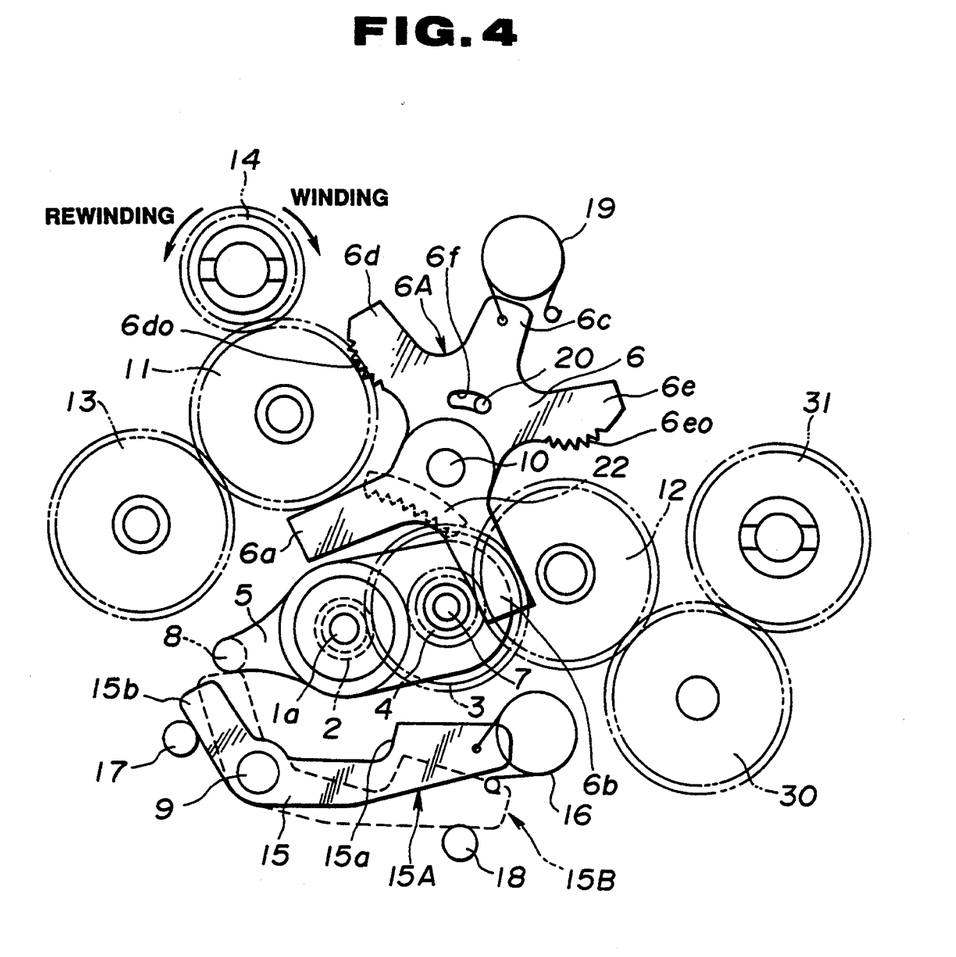
FIG. 4 is a plan view showing a switching action state of the epicyclic gear mechanism.
Figure 5:
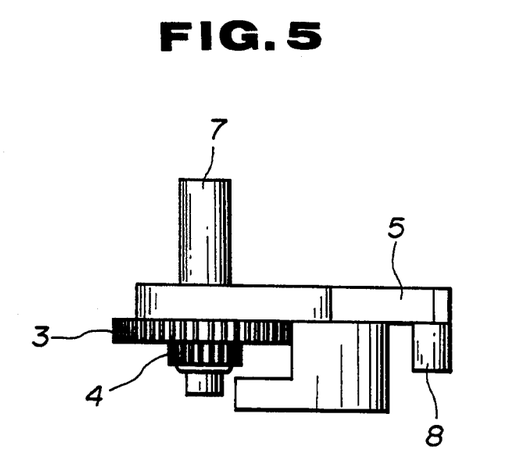
FIG. 5 is a side view illustrating a connection arm and a planet gear.

As illustrated in FIGS. 2-4, the sun gear 2 is fixed to an output shaft 1a of the motor 1. At the same time, the connecting arm 5 is supported on the output shaft 1a. This connecting arm 5 connects the sun gear 2 to one of the planet gears 3 (4); and a central shaft 7 of the planet gears 3 (4) is rotatably axially supported on an extended end part extending above the planet gears 3 (4). 10 The planet gears 3 (4) are, as shown in FIG. 5, constructed of 2-stage gears. The upper major-diameter gear 3 meshing with the sun gear 2 makes a revolving motion around the same gear 2 while rotating on its axis. The lower minor-diameter gear 4 rotates together with the upper major-diameter gear 3. As illustrated in FIGS. 3 and 4, the gear 4 meshes with the first driven gear 11 or the second driven gear 12 disposed on the trajectory of revolution of the same gear 4, whereby the rotational driving force is transmitted.

The first driven gear 11 is disposed on the trajectory of revolution of the planet gear 4 and thus forms a power transmission path to a film winding/rewinding mechanism. The first driven gear 11 meshes with a film winding/rewinding gear 14. Further, this first driven gear 11 engages with a rewinding gear 13 for causing the same gear 11 to rotate reversely (clockwise in FIGS. 3 and 4). This rewinding gear 13 is also provided on the trajectory of revolution of the planet gear 4 and disposed contiguous to the first driven gear 11. The planet gear 4 meshing with the first driven gear 11 further revolves counterclockwise about the sun gear 2, in which position 4A the rewinding gear 13 meshes with the same planet gear 4.

The second driven gear 12 disposed on the trajectory of clockwise revolution of the planet gear 4 constitutes a power transmission member to a zoom lens driving mechanism. The second driven gear 12 meshes with a transmission gear 30. This transmission gear 30 meshes with a shaft driving gear 31.

Then, an internal gear 22 serving as the abovementioned auxiliary member is disposed on the trajectory of revolution of the planet gear 4 between the first driven gear 11 and the second driven gear 12. This internal gear 22 is constructed of a partially circular arc internal gear. The internal gear 22 serves to assist the revolving motion of the planet gear while engaging with the same planet gear when the planet gear 4 revolves about the sun gear 2 from one driven gear toward the other driven gear.

On the other hand, a down-extension pin 8 is provided at an arm end part extending opposite to the extended end part, for axially supporting the central shaft 7 of the planet gears 3 (4), of the connecting arm 5. Then, an engagement oblique surface 15a formed on one arm of an engagement lever 15 properly engages with and disengages from this down-extension pin 8. The substantially V-shaped engagement lever 15 is disposed by the side of the down-extension pin 8. A substantially middle fulcrum of the lever 15 is so supported on a support shaft 9 as to be capable of swinging. The engagement oblique surface 15a is formed on one arm opposite to the pin 8 and extending toward the second driven gear 12. Given then to this engagement lever 15 is a behavior to shift counterclockwise to an angular position 15A and a clockwise to an angular position 15B about the support shaft 9 with the aid of a toggle spring 16 stretched between the end of one arm and a stationary member. The counterclockwise and clockwise positions 15A, 15B depending on this behavior are regulated by stopper pins 17, 18, respectively.

On the other hand, the rotation regulating member 6 is disposed in a location opposite to the engagement lever 15 with respect to the connecting arm 5. The rotation regulating member 6 consists of forked thrust arms 6a, 6b and three arm portions 6c, 6d, 6e. The thrust arms 6a, 6b are thrust by the central shaft 7 along the revolving path of the same shaft 7, protruding from the connecting arm 5, of the planet gears 3 (4). The arms 6c, 6d, 6e extend between the first driven gear 11 and the second driven gear 12. A substantially middle fulcrum of the rotation regulating member 6 is so supported on a support shaft 10 as to be capable of swinging. The bilaterally extending second and third arms 6d, 6e of the three arms 6c, 6d, 6e are formed in symmetry with respect to the first arm 6c extending from the center. An engagement segmentary gear 6do adapted for meshing with the first driven gear 11 is formed on the outer surface of the arm 6d. An engagement segmentary gear 6eo adapted for meshing with the second driven gear 12 is formed on the outer surface of the arm 6e. Given then to the rotation regulating member 6 is a behavior to rotate counterclockwise about the support shaft 10 with the aid of the toggle spring 19 stretched between the first arm 6c and a stationary member (unnumbered) and thereby shift to a position 6A (see FIG. 4) where the segmentary gear 6do meshes with the first driven gear 11. The rotation regulating member 6 is further provided with a behavior to rotate clockwise thereabout and thereby shift to a position 6B (see FIG. 3) where the segmentary gear 6eo meshes with the second driven gear 12. The angular positions 6A, 6B depending on this behavior are regulated by a partially circular a. rc rotation regulating provided 6f, holed between the first arm 6c and the support shaft 10, for receiving a stationary pin 20.

Figure 8:
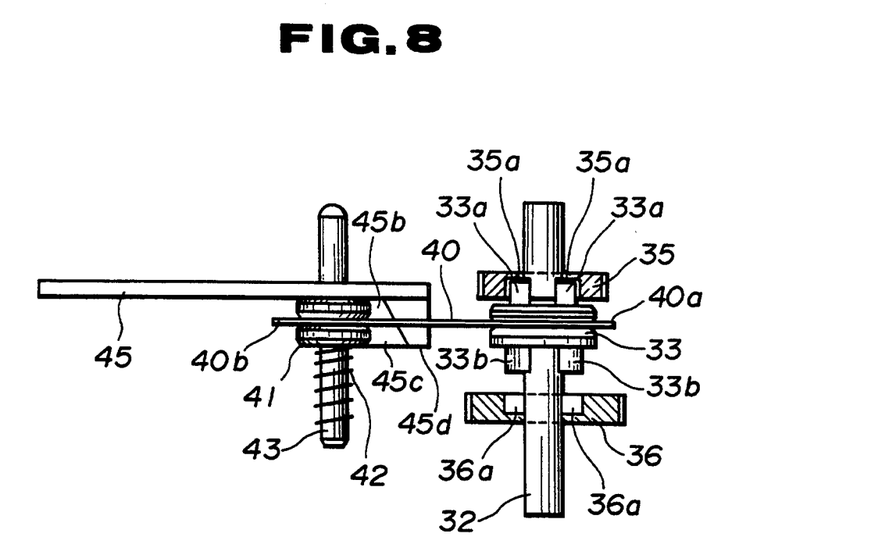
FIG. 8 is a side view illustrating a driving force transmission switching mechanism to the zoom lens driving mechanism.

Next, a driving force transmission path to the zoom lens driving mechanism will be explained with reference to FIGS. 2 and 6. The shaft driving gear 31 meshing with the transmission gear 30 is integrally mounted on a driving shaft 32 defined as a support shaft for the same gear 31. A pulley-shaped connection ring 33 is fixed to the upper part of this driving shaft 32. First and second transmission gears 35, 36 each rotatable about the driving shaft 32 are provided above and below the connection ring 33 interposed therebetween. Then, engaging recesses 35a, 35a are, as illustrated in FIG. 8, formed in bilateral symmetric positions, close to the driving shaft 32, of the undersurface of the upper first transmission gear 35. Engaging projections 33a, 33a projecting integrally from the driving shaft 32 are formed in bilateral symmetric positions, close to the center, on the upper surface of the connection ring 33. The engaging projections 33a, 33a thus engage with and disengage from the recesses 35a, 35a in accordance with up-and-down motions of the driving shaft 32. Further, engaging recesses 36a, 36a are also, as shown in FIG. 8, formed in bilateral symmetric positions, close to the driving shaft 32, of the upper surface of the lower second 36. Engaging projections 33b, 33b project in bilateral positions, close to the center, of the undersurface of the connecting ring 33. The projections 33b, 33b engage with and disengage from the recesses 36a, 36a in accordance with up-and-down motions of the driving shaft 32.

Figure 6:
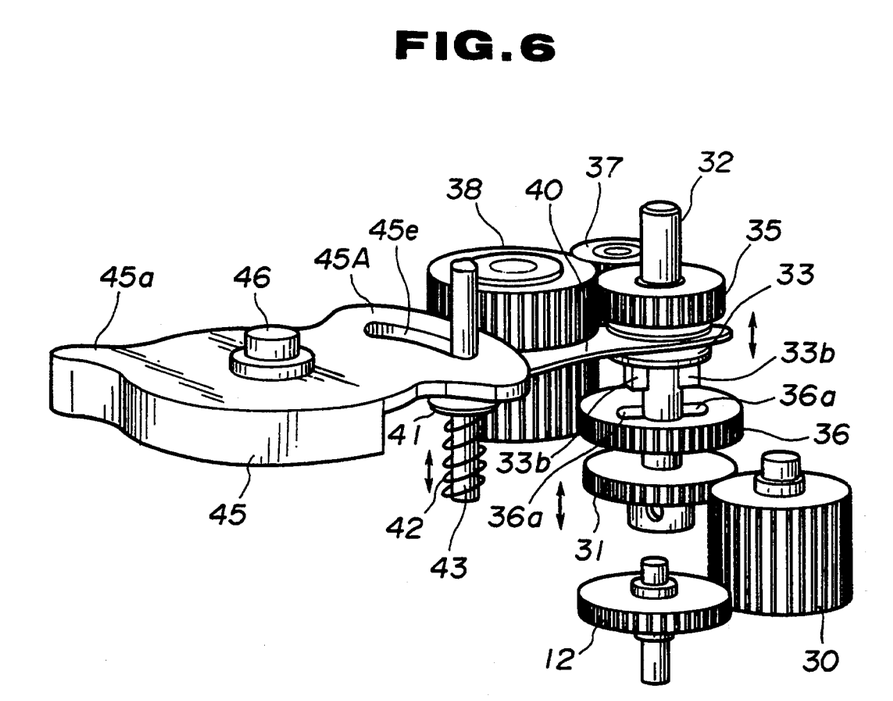
FIG. 6 is a perspective view showing a driving force transmission mechanism to the zoom lens driving mechanism.

Then, as illustrated in FIGS. 2 and 6, the first transmission gear 35 meshes with a first gear 37 constituting a transmission gear train. The first gear train 37 meshes with a second gear 38. In addition second transmission gear 36 meshes directly with the second gear 38. A third gear 50 consisting of a stage gear is, as shown in FIG. 2, linked to the second gear 38. A fourth gear 51 consisting of a stage gear is further linked to the third gear 50. A fifth gear 52 consisting of a stage gear is further linked to the fourth gear 51. Linked further to this fifth gear 52 is a driving gear 60 for moving the zoom lens in the optical axis direction through sixth gears 53a, 53b each consisting of a bevel gear.

Figure 7:
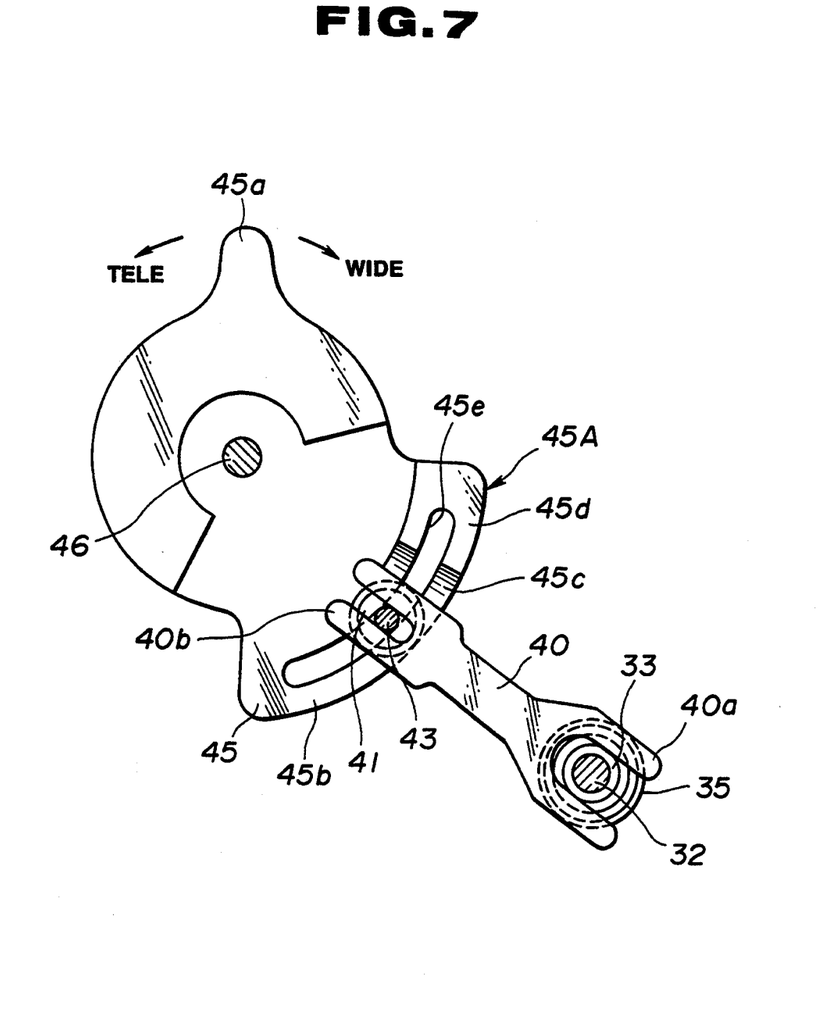
FIG. 7 is a rear view of a zoom manipulation member.

On the other hand, as depicted in FIGS. 6-8, the connection ring 33 is connected via an elastic connection plate 40 to a pulley-shaped operating ring 41. The operating ring 41 is moved in up-and-down directions by a zoom manipulating member 45 or a power switch knob 48 which will be mentioned later. More specifically, a fork member 40a is formed at one end of the elastic flexible connection plate 40 constructed of an elongate leaf spring having a small width. The fork member 40a is fitted in a minor-diameter drum peripheral part of the connection ring 33. A fork member 40b is formed at the other end of the elastic flexible connection plate 40. The fork member 40b is fitted in a minor-diameter drum peripheral part of the operating ring 41 fixed to the support shaft 43. This operating ring 41 is moved up and down together with the support shaft 43 by an oblique cam surface 45c formed on the underside of the inner edge portion of the zoom manipulating member 45 or a power switch knob 48 which will hereafter be stated.

The central portion of the disc-shaped zoom manipulating member 45 is rotatably supported on a support shaft 46. A manipulation knob 45a protruding outwardly of the camera is formed at the outer edge portion. A partially circular arc operating edge part 45A protruding outward is further formed at the inner edge portion. Formed substantially in the middle of the underside of this operating edge part 45A are, as illustrated in FIG. 7, a thin operating surface 45b and a thick surface 45d on both sides, with the oblique cam surface 45c interposed therebetween. Additionally, a partially circular arc-shaped guide hole 45e is formed in the central portion. The support shaft 43 passes through this guide hole 45e. The operating ring 41 is thrust upward by a coil spring 42 wound on the shaft 43. The upper surface of the operating ring 41 is press-fitted to the underside of the operation edge part 5A. In this press-fitted state, normally the operating ring 41 is press-fitted to the thin operating surface 45b.

Figure 9:
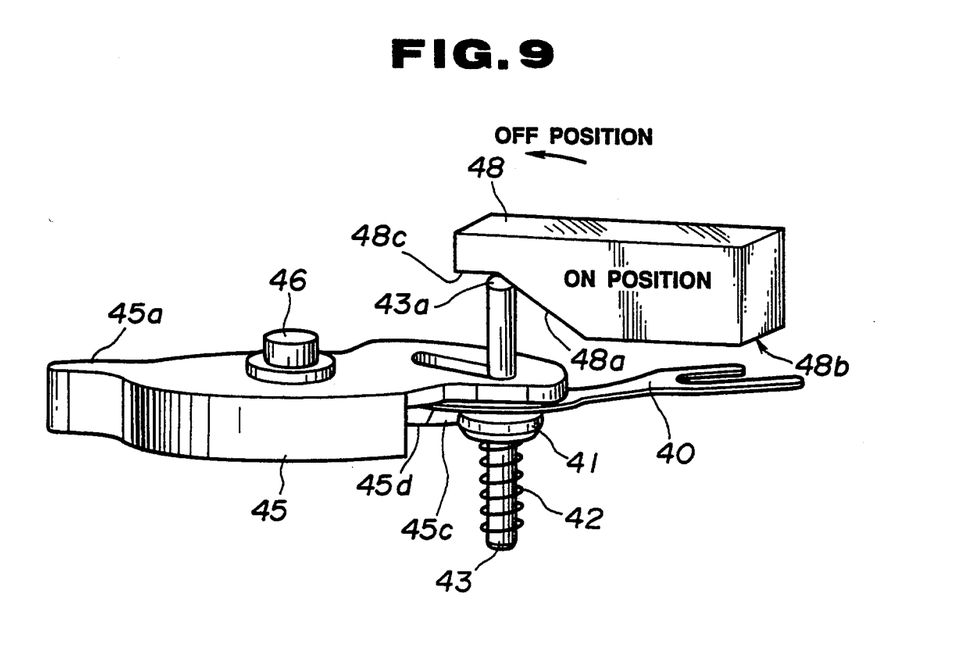
FIG. 9 is a perspective view showing a relationship between the zoom manipulation member and a power switch knob.

Further, the power switch knob 48 is, as illustrated in FIG. 9, slidably disposed on an upper end surface 43a of the support shaft 43. This power switch knob 48 can be manipulated from the outside of the camera. An oblique surface is formed on the undersurface of the power switch knob 48. When shifting the knob 48 to an ON position, a main switch is turned ON to bring the camera into an active state. At the same time, a thin part 48c of the same knob 48 faces an upper end surface 43a of the support shaft 43. Hence, the support shaft 43 rises, whereby the operating ring 41 is press-fitted to the thin operating surface 45b of the zoom manipulation member 45. Further, when shifting the same knob 48 to an OFF position, the main switch is turned OFF to put the camera into a non-active state. Simultaneously, a thick part 48b of the same knob 48 confronts the upper end surface 43a of the support shaft 43, and the support shaft 43 is therefore lowered.

The following is a description of the action of the thus constructed epicyclic gear mechanism in this embodiment. To begin with, the power switch knob 48 is shifted to the ON position of the main switch to bring the camera into the active state. Hereupon, the motor 1 shown in FIG. 2 rotates, with the result that the sun gear 2 rotates clockwise. On this occasion, the thin part 48c of the power switch knob 48 confronts the upper end surface 43a of the support shaft 43. Therefore, the support 43 ascends, and the operating ring 41 is thereby press-fitted to the thin operating surface 45b of the zoom manipulation member 45 (see FIG. 9).

When the sun gear 2 rotates clockwise, as illustrated in FIG. 4, the connection arm 5 also turns clockwise. The planet gear 4 meshes with the internal gear 22 and thereby revolves about the sun gear 2. Then, the planet gear 4 meshes with the second driven gear 12 located on the trajectory of revolution and constituting the power transmission member to the zoom lens driving mechanism. The rotational driving force of the motor 1 is thus transmitted to the driven gear 12. Further, when the connection arm 5 turns clockwise, the central shaft 7, protruding from the connection arm 5, of the planet gears 3 (4) thrusts round the other thrust arm 6b of the rotation regulating member 6. Consequently, the rotation regulating member 6 turns counterclockwise about the support shaft 10 by dint of an elastic force of the toggle spring 19. The rotation regulating member 6 thereby shifts to a position 6A where the segmentary gear 6do meshes with the first driven gear 11. The power is thus transmitted to the second driven gear 12. Meanwhile, the first driven gear 11 is restricted to hinder the rotation of the same gear 11. Hence, the film winding/rewinding mechanism does not make irregular motions during photographing. The film remains static due to the positive meshing action of gears 6do and 11.

In addition, when the connection arm 5 turns clockwise, the other arm 15b of the engagement lever 15 is pushed by the down-extension pin 8 thereof. The engagement lever 15 is thereby shifted to the position 15A where the lever turns counterclockwise about the support shaft 9 by the elastic force of the toggle spring 16.

Then, the planet gear 4 meshes with the second driven gear 12 in this state. The rotating force is transmitted to the transmission gear 30 and the shaft driving gear 31 as well. The connection ring 33 is rotated clockwise together with the driving shaft 33. At this moment, the operating ring 41 rises. Consequently, the engaging projections 33a, 33a of the connection ring 33 are fitted in the recesses 35a, 35a formed in the undersurface of the first transmission gear 35, whereby the connection ring 33 engages with the first transmission gear 35. Hence, the power of the connection ring 33 is transmitted via the first transmission gear 35 and the first gear 37 to the second gear 38. The second gear 38 is thereby rotated clockwise. The rotating force of this second gear 38 acts to further cause clockwise rotations of the driving gear 60 through the gear train consisting of the third to sixth gears 50, 51, 52 and 53a, 53b. The zoom lens driving mechanism is thereby actuated to move a zoom lens barrel in the optical axis direction. The zoom lens barrel is extended from a collapsed position to a photographing position (wide-angle).

In this wide-angle photographing state, the photographer turns the manipulation knob 45a of the zoom manipulation member 45 in the counterclockwise direction (in FIG. 7), i.e., in the telephoto direction. Then, the driving gear 60 goes on rotating clockwise, because the active state of the gear train remains as it is. The zoom lens barrel is further moved in the optical axis direction and brought into a telephoto state. Further, the photographer turns the manipulation knob 45a of the zoom manipulation member 45 in the clockwise direction (in FIG. 7), viz., in the wide-angle direction. Hereupon, the oblique cam surface 45c of the operating edge part 45A of the undersurface of the zoom manipulation member 45 confronts the upper surface of the operating ring 41. The operating ring 41 is then is pushed down together with the support shaft 43 while compressing the coil spring 42.

The connection ring 33 is thereby also released from the first transmission gear 35 and depressed. The connection gear 33 is connected to the second transmission gear 36 this time. To be more specific, the engaging projections 33b, 33b formed on the lower surface of the connection ring 33 are fitted in the recesses 36a, 36a formed in the upper surface of the second transmission gear 36. The connection ring 33 thereby engages with the second transmission gear 36. Consequently, the power of the connection ring 33 is transmitted from the second transmission gear 36 directly to the second gear 38.

On this occasion, the engaging projections 33b, 33b of the connection ring 33 are not immediately fitted in the recesses 36a, 36a in some cases. In this instance, however, the elastic connection plate 40 deflects, and the engaging projections 33b, 33b are pushed against the upper surface of the second transmission gear 36. The rotational power of the motor 1 is transmitted to the shaft driving gear 31. When the connection ring 33 continues to rotate, the engaging projections 33b, 33b are surely fitted in the recesses 36a, 36a in a position where the connection ring 33 turns through an angle of 180 degrees or less. The rotating force of the shaft driving gear 31 is thereby transmitted from the second transmission gear 36 directly to the second gear 38 this time.

Hereupon, the second gear 38 rotates counterclockwise. This rotating force acts to cause counterclockwise rotations of the driving gear 60 through a gear train consisting of the third to sixth gears 50, 51, 52 and 53a, 53b. The zoom lens barrel is thereby moved backward in the optical axis direction and extended to the photographing (wide-angle) position.

Further, when releasing the manipulation knob 45a of the zoom manipulation member 45 from the hand of the photographer, the zoom manipulation member 45 returns to the central position. The thin operating surface 45b of the operating edge part 45A confronts the upper surface of the operating ring 41. The operating ring 41 is again pushed up by a stretching force of the coil spring 42. The upper surface of the operating ring 41 impinges on the operating surface 45b. With an ascent of this operating ring 41, the connection ring 33 is also raised to get free of the second transmission gear 36 and is again connected to the first transmission gear 35. At this time also, similar to the projections 33a, 33a and recesses 35a, 35a the engaging projections 33a, 33a of the connection ring 33 are not immediately fitted in the recesses 35a, 35a in some cases. In this instance, the elastic connection plate 40 deflects. The engaging projections 33a, 33a are pushed against the lower surface of the first transmission gear 35. The rotational power of the motor 1 is therefore transmitted to the shaft driving gear 31. When the connection ring 33 continues to turn, the engaging projections 33a, 33a are surely fitted in the recesses 35a, 35a in the position where the connection ring 33 turns through an angle of 180 degrees or under.

Then, the shutter is released to effect photographing by performing the zooming operation as described above. Thereafter, the motor 1 rotates reversely. When the sun gear 2 rotates counterclockwise, the connection arm 5 is also, as shown in FIG. 3, turned counterclockwise. The planet gear 4 meshes with the internal gear 22 and revolves counterclockwise about the sun gear 2 to such a position that the down-extension pin 8 impinges on the engagement oblique surface 15a. This position existing on the trajectory of revolution is a position where the planet gear 4 meshes with the first driven gear 11 that forms the power transmission path to the film winding/rewinding mechanism. The rotational power of the motor 1 is thus transmitted to the driven gear 11. In addition, when the connection arm 5 turns counterclockwise, the central shaft 7, protruding upwardly from the connection arm 5, of the planet gears 3 (4) thrusts round one thrust arm 6a of the rotation regulating member 6. Consequently, the rotation regulating member 6 turns clockwise about the support shaft 10 by the elastic force of the toggle spring 19. The rotation regulating member 6 thus shifts to the position 6B where the segmentary gear 6eo meshes with the second driven gear 12. The power is thereby transmitted to the first driven gear 11. In the meantime, the second driven gear 12 is restricted to hinder the rotation of the same gear 12. Hence, the zoom lens driving mechanism does not make irregular motions during the winding/rewinding operation of the film. The stop position of the zoom lens barrel can be thus assured.

The planet gear 4 meshes with the first driven gear 11, and when the same gear 11 is rotated counterclockwise, the film winding/rewinding gear 14 is rotated clockwise. The film is thus wound up.

Further, when eventually coming to a film end with repetitions of photographing and film winding operations, the film winding/rewinding gear 14 temporarily stops because of the terminal end of the film being fixed to a film spool. Then, the load hereby augments, and the torque of the motor 1 increases. Consequently, the torque of the connection arm 5 can not be resisted by the elastic force of the toggle spring 16 which restricts the engagement lever 15. Hence, the engagement lever 15 turns clockwise about the support shaft 9 and shifts to the position 15B where the lever 15 impinges on the stopper pin 18. Hereupon, the connection arm 5 further turns counterclockwise, and therefore the planet gear 4 disengages from the first driven gear 11o The planet gear 4 shifts to a position 4A (3A) where the planet gear 4 meshes with the rewinding gear 13 this time. This rewinding gear 13 is linked via the first driven gear 11 to the rewinding gear 14. When the sun gear 2 rotates counterclockwise, it therefore follows that the rewinding gear 14 is rotated counterclockwise this time. The film is thus rewound.

Upon an end of rewinding of the film, the sun gear 2 is temporarily rotated clockwise, and the connection arm 5 also turns clockwise. The down-extension pin 8 impinges on the other arm 15b of the engagement lever 15. The engagement lever 15 is thereby shifted to the normal position 15A where the lever 15 turns counterclockwise about the support shaft 9 and impinges on the stopper pin 17. With this motion, the power is transmitted again in such a direction as to wind up the film.

Then, the photographer finishes photographing and shifts the power switch knob 48 to the OFF position of the main switch. Hereupon, as explained earlier, the operating ring 41 is depressed to lower the connection ring 33. The connection ring 33 engages with the second transmission gear 36, whereby the gear train is actuated in such a direction as to extend the lens barrel. The lens barrel moves from the photographing position to the collapsed position.

Note that the epicyclic gear mechanism of the present invention is applied to the construction to switch over the zoom lens driving mechanism and the film winding/rewinding mechanism in the embodiments discussed above, but the present invention is not limited to this construction. For example, the epicyclic gear mechanism of this invention is, as a matter of course, applied to a construction wherein the rotational power of the motor is transmitted for controlling an exposure of the shutter and for extending the lens during auto-focusing.

What is claimed is:

1. An epicyclic gear mechanism comprising:
   a sun gear selectively rotatable in forward and reverse directions by a two-directional driving source such as a motor;
   a plant gear maintained in meshing engagement with said sun gear;
   a connection arm for connecting a rotational center of said sun gear to a rotational center of said planet gear and supporting said planet gear so that said planet gear is revolvable about said sun gear;
   a first driven gear provided along a trajectory of revolution of said planet gear, meshing with said planet gear in a first state when said planet gear revolves in one direction and is rotationally driven when said planet gear rotates about its axis in said first state;
   a second driven gear provided along the trajectory of revolution of said planet gear, meshing with said planet gear in a second state when said planet gear revolves in another direction and is rotationally driven when said planet gear rotates about its axis in said second state;
   an auxiliary member, arranged along the trajectory of revolution of said planet gear and provided between said first and second driven gears, for assisting the revolving motion of said planet gear while meshing with said planet gear when said planet gear revolves from one of said driven gears toward another one of said driven gears;
   a rotation regulating means, actuated by interlocking with the revolving motion of said planet gear, for regulating the rotation of said second driven gear by acting on said second driven gear when said planet gear meshes with said first driven gear and regulating the rotation of said first driven gear by acting on said first driven gear when said planet gear meshes with said second driven gear; and
   a biasing means for biasing said rotation regulating means in such a state as to selectively act on one of said first driven gear and said second driven gear.

2. The epicyclic gear mechanism according to claim 1, wherein said auxiliary member is an internal gear.

3. The epicyclic gear mechanism according to claim 2, wherein said action part of said rotation regulating means consists of a regulating gear meshing with said driven gear.

4. The epicyclic gear mechanism of claim 3 wherein said regulating gear is an arcuate-shaped gear segment.

5. The epicyclic gear mechanism of claim 4 wherein said internal gear is mounted upon said rotation regulating means.

6. The epicyclic gear mechanism according to claim 1, wherein said rotation regulating means is composed of a drive part driven by said planet gear and an action part for acting on said driven gears.

7. The epicyclic gear mechanism according to claim 6, wherein said drive part of said rotation regulating means comprises projections extending inwardly of the trajectory of revolution of said planet gear.

8. The epicyclic gear mechanism according to claim 1, wherein said rotation regulating means includes a pair of extension arms extending along the trajectory of revolution of said planet gear, a pair of action arms for acting respectively on said driven gears and an action part on which said biasing means acts.

9. The epicyclic gear mechanism according to claim 1, wherein a revolving force of said planet gear assisted by said auxiliary member is greater than a biasing force of said biasing means.

10. The epicyclic gear mechanism according to claim 1, wherein said biasing means is a toggle spring.

11. The epicyclic gear mechanism of claim 1 wherein the regulating action of said rotation regulating means includes means to halt rotation of the associated driven gear.

12. The epicyclic gear mechanism of claim 11 wherein said internal gear is mounted upon said rotation regulating means.

13. The epicyclic gear mechanism of claim 1 wherein said auxiliary member is an internal gear having an arcuate concave gear portion for meshing with said planet gear.

14. An epicyclic gear mechanism comprising:
a sun gear rotationally driven by a single driving source;
a planet gear maintained in meshing engagement with said sun gear;
a connection arm for connecting a rotational center of said sun gear to a rotational center of said planet gear and supporting said planet gear so that said planet gear is revolvable about said sun gear;
a first driven gear meshing with said planet gear when said planet gear revolves in one direction and is thereby rotationally driven;
a second driven gear meshing with said planet gear when said planet gear revolves in another direction and is thereby rotationally driven;
an auxiliary member, arranged along a trajectory of revolution of said planet gear and provided between said first and second driven gears, for assisting the revolving motion of said planet gear while meshing with said planet gear when said planet gear revolves from one of said driven gears toward another of said driven gears;
a rotation regulating member, interlocking with the revolving motion of said planet gear, for regulating the rotation of said other driven gear by acting on said other driven gear when said planet gear meshes with said one driven gear; and
a biasing means for biasing said rotation regulating means so as to act on a selected one of said first driven gear and said second driven gear.

15. The epicyclic gear mechanism according to claim 14, wherein said auxiliary member is an internal gear.

16. The epicyclic gear mechanism of claim 15 wherein said auxiliary member is an internal gear having an arcuate concave gear for meshing with said planet gear.

17. The epicyclic gear mechanism according to claim 14, wherein said rotation regulating member includes a gear meshing with said driven gear.

18. The epicyclic gear mechanism of claim 17 wherein said internal gear is mounted upon said rotation regulating means.

19. The epicyclic gear mechanism according to claim 14, wherein said biasing means is a toggle spring.

20. An epicyclic gear mechanism comprising:
a sun gear rotationally driven by a single driving source; and
a planet gear constantly in meshing engagement with said sun gear,
said mechanism further including:
a plurality of driven gears selectively meshing with said planet gear when said planet gear revolves and are thereby selectively rotationally driven;
a rotation preventing member, interlocking with the revolving motion of said planet gear, for preventing rotation of one of said driven gears by acting on said one of said driven gears when said planet gear meshes with another one of said driven gears; and
a biasing means for biasing said rotation preventing member so as to act on a selected one of said plurality of driven gears.

21. The epicyclic gear mechanism according to claim 20, wherein said rotation regulating means includes a gear meshing with a driven gear.

22. The epicyclic gear mechanism according to claim 20, wherein said rotation regulating member is biased by a toggle spring to constantly hinder rotation of a selected one of said driven gears.

23. The epicyclic gear mechanism of claim 13 wherein a regulating action of said rotation preventing means includes means to halt rotation of the associated driven gear.

24. An epicyclic gear mechanism comprising:
a sun gear rotationally driven by a single driving source;
a planet gear in constant meshing engagement with said sun gear; and
a plurality of driven gears, said planet gear selectively meshing with one of said driven gears when said planet gear revolves and is thereby selectively rotationally driven,
said mechanism further including:
an auxiliary member, arranged along a trajectory of revolution of said planet gear and provided between said plurality of driven gears, for assisting the revolving motion by meshing with said planet gear when said planet gear revolves;
a rotation regulating member, interlocking with the revolving motion of said planet gear, for regulating the rotation of one of said driven gears by acting on said one of said driven gears when said planet gear meshes with another one of said driven gears; and
a biasing means for biasing said rotation regulating member so as to act on a selected one of said plurality of driven gears.

25. The epicyclic gear mechanism according to claim 24, wherein said regulating member changes a driven gear on which said planet gear acts by impinging on said planet gear when said planet gear revolves.

26. The epicyclic gear mechanism according to claim 24, wherein said auxiliary member changes a driven gear on which said planet gear acts by impinging on said planet gear when said planet gear revolves.

27. The epicyclic gear mechanism according to claim 26, wherein said auxiliary member changes said driven gear on which said planet gear acts depending on the revolution of said planet gear.

28. In an epicyclic gear mechanism having:
a sun gear rotationally driven by a single driving source;
a planet gear constantly meshing with said sun gear; and
a plurality of driven gears, said planet gear selectively meshing with one of said driven gears when said planet gear revolves and thereby is selectively rotationally driven,
the improvement comprising:
a movable means, biased toward one of said driven gears responsive to movement of said planet gear when said planet gear meshes with another of said driven gears, for preventing rotation of said one of said driven gears.

29. The epicyclic gear mechanism according to claim 28, wherein said means for preventing rotation changes said driven gear on which said means for preventing rotation acts depending on a rotating direction of said planet gear.

30. The epicyclic gear mechanism according to claim 28, further comprising an auxiliary member for assisting the revolution of said planet gear.

31. The epicyclic gear mechanism according to claim 30, wherein said auxiliary member is an internal gear with which said planet gear meshes.

32. In an epicyclic gear mechanism having:
a plurality of driven gears, a sun gear and a planet gear meshed with said sun gear for revolving thereabout for selective meshing engagement with one of said driven gears;
the improvement comprising:
a rotation preventing member, biased toward one of said driven gears responsive to revolving of said planet gear and thereby acting when said planet gear meshes with another one of said driven gears, for preventing rotation of said one of said driven gears.

33. The epicyclic gear mechanism of claim 32 wherein a regulating action of said rotation preventing member includes means to halt rotation of the associated driven gear.

34. A camera comprising:
an epicyclic gear mechanism having a sun gear rotatable forward and reversely by a driving source such as a motor and a planet gear constantly meshing with said sun gear;
a first driven gear provided along a trajectory of revolution of said planet gear, meshing with said planet gear when said planet gear revolves in one direction and rotationally driven when said planet gear rotates on its axis in that position, said first driven gear being connected to a first predetermined driving mechanism of said camera;
a second driven gear provided along the trajectory of revolution of said planet gear, meshing with said planet gear when said planet gear revolves in another direction and rotationally driven when said planet gear rotates on its axis in that position, said second driven gear being connected to a second predetermined driving mechanism of said camera;
an auxiliary member, arranged along the trajectory of revolution of said planet gear and provided between said first and second driven gears, for assisting the revolving motion of said planet gear while meshing with said planet gear when said planet gear revolves from one of said driven gears toward another of said driven gears;
a rotation regulating means, actuated by interlocking with the revolving motion of said planet gear, for regulating the rotation of said second driven gear by acting on said second driven gear when said planet gear meshes with said first driven gear and regulating the rotation of said first driven gear by acting on said first driven gear when said planet gear meshes with said second driven gear; and
a biasing means for biasing said rotation regulating means so as to selectively act on one of said first driven gear and said second driven gear.

35. The camera according to claim 34, wherein said auxiliary member is an internal gear.

36. The camera according to claim 34, wherein said rotation regulating member is composed of a drive part driven by said planet gear and an action part for acting on said driven gears.

37. The camera according to claim 36, wherein said drive part of said rotation regulating member consists of projections extending across the trajectory of revolution of said planet gear.

38. The camera according to claim 36, wherein said action part of said rotation regulating means comprises a gear meshing with a driven gear.

39. The camera according to claim 36, wherein said rotation regulating member is provided with two drive parts and two action parts, respectively.

40. The camera according to claim 34, wherein said first driven gear is connected to a photographing lens barrel driving mechanism.

41. The camera according to claim 36, wherein said second driven gear is connected to a film winding-/rewinding mechanism.

42. The camera according to claim 40, wherein said planet gear normally meshes with said first driven gear in an initial state of said camera.

43. The camera according to claim 41, wherein said rotation regulating member acts on said second driven gear in an initial state of said camera.

44. A camera comprising:
an epicyclic gear mechanism constructed of a sun gear rotationally driven by a single driving source and a planet gear constantly meshing with said sun gear;
a plurality of driven gear, said plaet gear selectively meshing with one of said driven gears when said planet gear revolves and is thereby rotationally driven, said plurality of driven gears being connected respectively to a film winding/rewinding mechanism and a photographing lens barrel driving mechanism;
an auxiliary member, arranged along a trajectory of revolution of said planet gear and provided between said plurality of driven gears, for assisting the revolving motion of said planet gear by meshing with said planet gear when said planet gear revolves;
a rotation regulating member, interlocking with the revolving motion of said planet gear, for regulating the rotation of one of said driven gears by acting on said one of said driven gears when said planet gear meshes with another one of said driven gears; and a biasing means for biasing said rotation regulating member so as to selectively act on one of said plurality of driven gears.

45. The camera according to claim 44, wherein said auxiliary member is an internal gear.

46. The camera according to claim 44, wherein said photographing lens barrel driving mechanism alters a focal distance of a photographing lens.

47. The camera according to claim 44, wherein said planet gear in an initial state of said camera meshes with said driven gear connected to said photographing lens barrel driving mechanism.

48. The camera according to claim 44, wherein said rotation regulating member in an initial state of said camera regulates rotation of said driven gear connected to said film winding/rewinding mechanism.

49. The camera according to claim 44, wherein said rotation regulating member in an initial state of said camera prevents rotation of said driven gear connected to said film winding/rewinding mechanism.

50. A camera comprising:

an epicyclic gear mechanism comprised of a sun gear rotationally driven by a single driving source and a planet gear constantly meshing with said sun gear, said camera including:

a plurality of driven gears, said planet gear selectively meshing with one of said driven gears when said planet gear revolves and is thereby rotationally driven, for sequentially executing an operating sequence in said camera;

an auxiliary member, arranged along a trajectory of revolution of said planet gear and provided between said plurality of driven gears, for assisting the revolving motion of said planet gear by acting on said planet gear when said planet gear revolves;

a rotation regulating member, interlocking with the revolving motion of said planet gear, for regulating rotation of one of said driven gears by acting on said one of said driven gears when said planet gear meshes with another one of said driven gears; and a biasing means for biasing said rotation regulating member so as to selectively act on one of said plurality of driven gears.

51. The camera according to claim 50, wherein one of said plurality of driven gears is connected to a film winding/rewinding mechanism.

52. The camera according to claim 50, wherein one of said plurality of driven gears is connected to a photographing lens barrel driving mechanism.

53. The camera according to claim 52, wherein said photographing lens barrel driving mechanism alters a focal distance of a photographing lens.

54. The camera according to claim 52, wherein said photographing lens barrel driving mechanism alters a focal position of said photographing lens.

55. The camera according to claim 50, wherein one of said plurality of driven gears is connected to a mechanism for changing over a size of a photographing picture.

56. The camera according to claim 50, wherein one of said plurality of driven gears is connected to a shutter opening/closing mechanism.

57. In a camera having:

an epicyclic gear mechanism, having a sun gear, a planet gear meshing with the sun gear and revolving thereabout for selectively meshing with one of a plurality of driven gears, for selectively driving a sequence driving mechanism;

the improvement comprising:

a rotation preventing member, biased toward one of said driven gears, and thereby responsive to a planet gear revolving.and meshing with said one driven gear to drive said one of said driven gears, for preventing rotation of said other driven gear.

58. A camera comprising an epicyclic gear mechanism driven by a single driving source, said camera further including:

a first driven gear provided along a trajectory of revolution of a planet gear, meshing with said planet gear when said planet gear revolves in one direction and is thereby rotationally driven when said planet gear rotates about its axis in that position, said first driven gear being connected to a predetermined driving mechanism of said camera;

a second driven gear provided contiguous to the outer periphery of the trajectory of revolution of said planet gear, meshing with said planet gear when said planet gear revolves in another direction opposite said one direction and is thereby rotationally driven when said planet gear rotates on its axis while regulating the revolution of said planet gear, said second driven gear being connected to another predetermined driving mechanism of said camera;

a third driven gear meshing with said second driven gear, provided contiguous to the outer periphery of the trajectory of revolution of said planet gear and meshing with said planet gear by releasing the hindrance of revolution when said planet gear meshes with said second driven gear;

an auxiliary member, arranged along the trajectory of revolution of said planet gear and provided between said first and second driven gears, for assisting the revolving motion of said planet gear by meshing with said planet gear when said planet gear revolves from said one driven gear toward the other driven gear;

a rotation regulating member, actuated by interlocking with the revolving motion of said planet gear, for regulating the rotation of said second driven gear by acting on said second driven gear when said planet gear meshes with said first driven gear and regulating the rotation of said first driven gear by acting on said first driven gear when said planet gear meshes with said second driven gear; and a biasing means for biasing said rotation regulating member so as to selectively act on one of said first driven gear and said second driven gear.

59. The camera according to claim 58, wherein said first driven gear is connected to a photographing lens barrel driving mechanism.

60. The camera according to claim 58, wherein said second driven gear is connected to a film winding mechanism.

61. The camera according to claim 58, wherein said third driven gear is connected to a film rewinding mechanism.

62. The camera according to claim 58, wherein the revolution of said planet gear is hindered when meshing with said second driven gear by causing a lever for axially supporting said planet gear to impinge on an engagement member.

63. The camera according to claim 58, wherein said planet gear revolves about said sun gear from said second driven gear toward said third driven gear in such a way that when said second driven gear is stopped by an outside means, and said planet gear thereby runs over said engagement member to continue the revolution.

64. The epicyclic gear mechanism of claim 57 wherein a regulating action of said rotation preventing member includes means to halt rotation of the associated driven gear.

65. A camera comprising:
an epicyclic gear mechanism driven by a single driving source,
said camera further including:
a first driven gear provided on a trajectory of revolution of a planet gear, and meshing with said planet gear when said planet gear revolves in one direction and is thereby rotationally driven when said planet gear rotates on its axis in that position, said first driven gear being connected to a photographing lens barrel driving mechanism;
a second driven gear provided contiguous to the outer periphery of the trajectory of revolution of said planet gear, meshing with said planet gear when said planet gear revolves in another direction and thereby is rotationally driven when said planet gear rotates about its axis while regulating the revolution of said planet gear, said second driven gear being connected to a film winding mechanism;
a third driven gear meshing with said second driven gear, provided contiguous to an outer periphery of the trajectory of revolution of said planet gear and meshing with said planet gear by releasing the hindrance of revolution when said planet gear meshes with said second driven gear;
an auxiliary member, arranged along the trajectory of revolution of said planet gear and provided between said first and second driven gears, for assisting the revolving motion of said planet gear by meshing with said planet gear when said planet gear revolves from one driven gear toward the other driven gear;
a rotation regulating member, actuated by interlocking with the revolving motion of said planet gear, for regulating the rotation of said second driven gear by acting on said second driven gear when said planet gear meshes with said first driven gear and regulating the rotation of said first driven gear by acting on said first driven gear when said planet gear meshes with said second driven gear; and
a biasing means for biasing said rotation regulating member so as to selectively act on one of said first driven gear and said second driven gear.

66. A driving mechanism comprising:
a driving means, including a first gear means, for selectively rotationally driving said first gear means in one of two directions;
two driven means defined as second and third gear means displaced from said first gear means and selectively undergoing a driving force of said driving means;
a switching means engaging said first gear means for selectively transmitting the driving force of said driving means to one of said gear means of said driven means; and
a stopping means, biased and turned by receiving a switching force due to a turning drive of said driving means and including a biasing means for holding a biased state, for stopping the driven means that is not driven when said switching means drives another one of said driven means.

67. The driving mechanism according to claim 66, wherein said driving means includes an electric motor for rotating in a selected one of two directions and a gear means.

68. The driving mechanism according to claim 66, wherein one of said two driven means is a film feeding means, and the other is a driving means for a zoom lens.

69. The driving mechanism according to claim 66, wherein said switching means includes an epicyclic gear mechanism.

70. The driving mechanism according to claim 66, wherein said biasing means includes a toggle spring means.

71. A driving mechanism comprising:
a driving means;
two driven means selectively undergoing a driving force of said driving means;
a switching means for transmitting the driving force of said driving means to a selected one of said driven means; and
a swingable stopping means, biased and turned by an action of said switching means and including a biasing means for holding a biased state, for stopping one of said driven means when said driving means drives another one of said driven means.

72. The driving mechanism according to claim 71, wherein said driving means consists of an electric motor rotatable in a selective one of two directions.

73. The driving mechanism according to claim 71, wherein one of said two driven means is a film feeding means of a camera, and the other is a driving means for a zoom lens.

74. The driving means according to claim 71, wherein said switching means includes an epicyclic gear mechanism.

75. The driving mechanism according to claim 71, wherein said biasing means includes a toggle spring means.

76. A driving mechanism comprising:
a driving means;
a first driven means displaced from said driving means selectively undergoing a driving force of said driving means;
a second driven means displaced from said driving means selectively undergoing the driving force of said driving means;
a switching means for transmitting the driving force of said driving means to a selected one of said driven means; and
a stopping means, biased and turned by an action of said switching means and including a biasing means for holding a biased state, for stopping said second driven means when said driving means drives said first driven means and stopping said first driven means when said driving means drives said second driven means.

77. The driving mechanism according to claim 76, wherein said driving means consists of an electric motor rotatable in a selected one of two directions.

78. The driving mechanism according to claim 76, wherein one of said two driven means is a film feeding means of a camera, and the other is a driving means for a zoom lens.

79. The driving mechanism according to claim 76, wherein said switching means includes an epicyclic gear mechanism.

80. The driving mechanism according to claim 76, wherein said biasing means includes a toggle spring means.

81. A driving mechanism comprising:
an electromotive driving means;
a plurality of driven means displaced from said driving means selectively driven by said electromotive driving means;
a transmission switching means for selecting a driven means to be driven by said driving means; and
a movable stopping means, biased to a given state responsive to operation of said transmission switching means and including a biasing means for holding said biased state, for stopping a driven means of said plurality of driven means which is not being driven.

82. The driving mechanism according to claim 81, wherein one of said plurality of driven means is a film feeding means of a camera, and the other is a driving means for a zoom lens.

83. The driving mechanism according to claim 81, wherein said transmission switching means includes an epicyclic gear mechanism.

84. The driving mechanism according to claim 81, wherein said biasing means includes a toggle spring means.

85. A drive mechanism for selectively driving a zoom lens in one of two directions between a collapsed position and a telephoto position comprising:
a common shaft;
a driven gear fixed on said common shaft for rotating said common shaft when meshed with a drive gear;
second and third gears rotatably mounted upon said common shaft;
movable means arranged between said second and third gears and rotated by said shaft for coupling rotation of said driven gear to one of said second and third gears when moved in a first direction along an axis of said common shaft and coupling rotation of said drive gear to another one of said second and third gears when moved in an opposite direction along said shaft axis;
a zoom mechanism;
an output gear for driving said zoom mechanism in a first direction when said second gear is driven by said common shaft under control of said switching means; and
an intermediate gear meshing with said third gear and said output gear and being driven by said third gear to cause said output gear to rotate said zooming mechanism in a reverse direction when said third gear is coupled for rotation with said common shaft.

86. The selective drive means of claim 85 further comprising:
an operating handle movable between first and second positions for selectively driving said zoom mechanism in said first and second directions;
a flexible, resilient member having a first end selectively movable in first and second directions along a linear path responsive to a first and a second position of a switch means; and
a free second end of said flexible member being coupled to a switchable member whereby movement of said switching means selectively causes engagement of one of said second and third gears with said common shaft.

87. The switching means of claim 86 further comprising:
rotatable means having an upper and lower cam surface joined by a diagonally aligned cam surface; and
spring means normally urging said first end of said flexible means toward said cam surface whereby rotation of said rotatable means in a first direction urges said flexible member downwardly and whereby rotation in a second direction opposite said first direction allows said flexible member to be moved upwardly under control of said spring means.

88. The drive mechanism of claim 85 wherein said movable means is fixed to said shaft and said shaft and driven gear move together with said movable means.

89. The drive mechanism of claim 88 wherein said drive gear has a length measured in an axial direction which assures meshing engagement with said driven gear regardless of which of the second and third gears is engaged by said movable means.

90. An epicyclic gear mechanism comprising:
a sun gear rotationally driven by a single driving source; and
a planet gear constantly in meshing engaement with said sun gear,
said mechanism further including:
a plurality of driven gears selectively meshing with said planet gear when said planet gear revolves and are thereby selectively rotationally driven;
a rotation preventing member, interlocking with the revolving motion of said planet gear, for preventing rotation of one of said driven gears by acting on said one of said driven gears when said planet gear meshes with another one of said driven gears;
a biasing means for biasing said rotation preventing member so as to act on a selected one of said plurality of driven gears; and
an auxiliary member, arranged along a trajectory of revolution of said planet cam provided between said plurality of driven gears, for assisting the revolving motion by meshing with said planet gear when said planet gear revolves.

91. The epicyclic gear mechanism according to claim 90 wherein said auxiliary member is an internal gear.

* * * * *